United States Patent [19]

Nakahigasi et al.

[11] Patent Number: 4,924,055
[45] Date of Patent: May 8, 1990

[54] SPOT GUN FOR A WELDER MACHINE

[75] Inventors: Isamu Nakahigasi; Yoshio Suzuki, both of Mie, Japan

[73] Assignee: Shinano Pneumatic Industries Inc., Mure, Japan

[21] Appl. No.: 246,843

[22] Filed: Sep. 20, 1988

[30] Foreign Application Priority Data

Sep. 28, 1987 [JP] Japan .................... 62-243261

[51] Int. Cl.⁵ .................................... B23K 11/30
[52] U.S. Cl. ........................ 219/86.21; 219/86.33
[58] Field of Search ............... 219/86.25, 86.21, 86.33

[56] References Cited

U.S. PATENT DOCUMENTS 4,438,309 3/1984 Zimmer ........................ 219/86.25
4,517,435 5/1985 Humblot ....................... 219/86.25

Primary Examiner—Clifford C. Shaw
Attorney, Agent, or Firm—Schwartz & Weinrieb

[57] ABSTRACT

A bearing is located at the front of a frame and through means of this bearing an electrode disposed upon one side of a welding gap and an electrode disposed upon the other side of the welding gap can be positioned opposite each other upon a horizontal central axis line, so that with the electrode part upon one side of the welding gap having an electrode bit at the front thereof being movable forwardly and backwardly while connected with the bearing, an object to be welded can be gripped between the electrode bit on the one side and the electrode bit on the other side; and if the electrode on the other side which is provided with a bracket having the other electrode bit disposed at its tip, and which is attached externally to the bearing, is rotated around the electrode upon the one side, spot welding in many different positions, including upwardly, downwardly and sideways, can be easily achieved.

16 Claims, 5 Drawing Sheets

SPOT GUN FOR A WELDER MACHINE

BACKGROUND OF THE INVENTION

This invention concerns a spot gun for a welder machine, and more specifically a hand-held spot gun used in connection with a variety of spot welding operations, which is operated by manually squeezing a throttle lever which is connected to an electrode part connected to the tip of a cable which extends at some length from the body of the spot welder machine.

DESCRIPTION OF PRIOR ART

Hand-held spot guns constructed in accordance with the prior art as seen in FIG. 9 usually have a pair of upper and lower protruding brackets 8 extending parallel with respect to each other at the front of the gun body 23, with a pair of electrode bits 6A, 6B attached in an opposing relationship at the tip of each bracket 8. In addition these guns are constructed such that a throttle lever 11 is mounted at the back of the gun body 23 and a grip lever 12 is mounted at the side of the gun body 23, and the gun body 23 is connected to the ends of two cables 13 extending from the main welder machine (not shown), 5A and 5B being cable connectors. The device is employed by gripping the grip lever 12 in one hand so as to hold the main body and operating the throttle lever 11 with the other hand, thus moving the end of the upper bracket 8 so that the pair of electrode bits 6A, 6B are moved so as to grip the object to be welded (not shown) between the electrode bits 6A, 6B, and allowing electric current to flow so as to carry out the spot welding operation.

When hand-held spot welding operation guns of this prior art type were employed in connection with the welding of window frames wherein forward welding, backward welding or sideways welding was required, the entire spot gun had to be continuously moved either forwardly or backwardly while connected to the thick cables 13. This was because the gun was constructed with the pair of upper and lower brackets 8 protruding from the front of the gun body 23, with the brackets 8 and the electrode bits 6A, 6B fixed in position.

This type of welding in which the position of the gun had to be continually moved backwardly and forwardly or sideways when welding objects such as, for example, window frames gripped between a pair of upper and lower opposed electrode bits 6A, 6B, was extremely difficult, and hand-held welding work of this kind was performed inefficiently and with reduced ease of operation.

SUMMARY OF THE INVENTION

This invention aims to provide a new type of spot welding gun which eliminates the above disadvantages of the prior art.

BRIEF DESCRIPTION OF THE DRAWINGS

Various other objects, features, and attendant advantages of the present invention will become more apparent from the following detailed description, when considered in connection with the accompanying drawings, in which like reference characters designate like or corresponding parts throughout the several views, and wherein.

DESCRIPTION OF THE PREFERRED EMBODIMENTS

Figure 1:
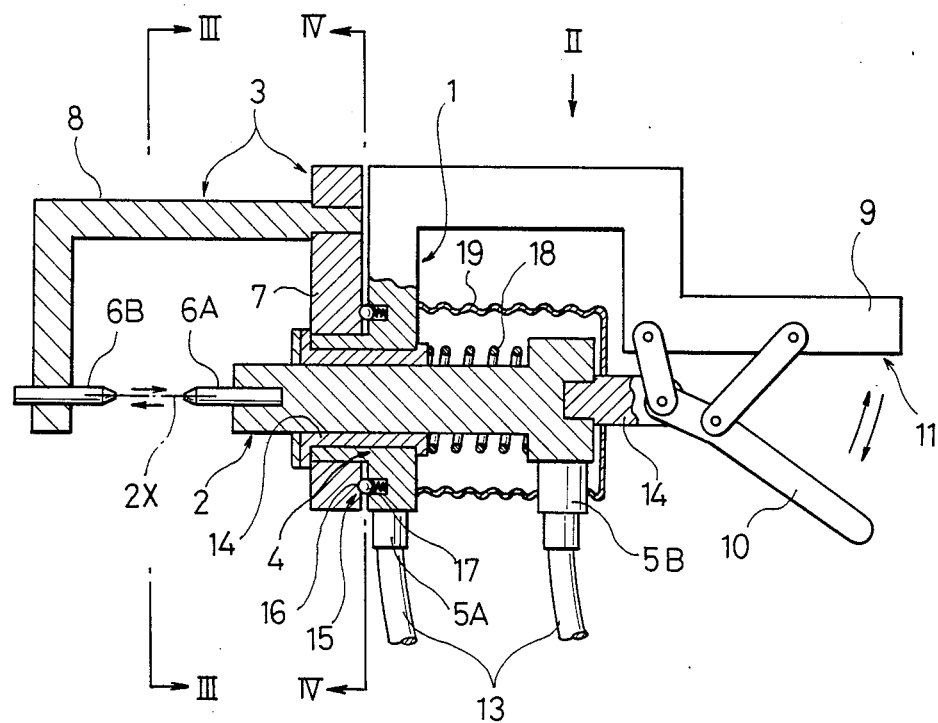
FIG. 1 is an abbreviated sectional side view of one embodiment of the spot gun of this invention.
Figure 2:
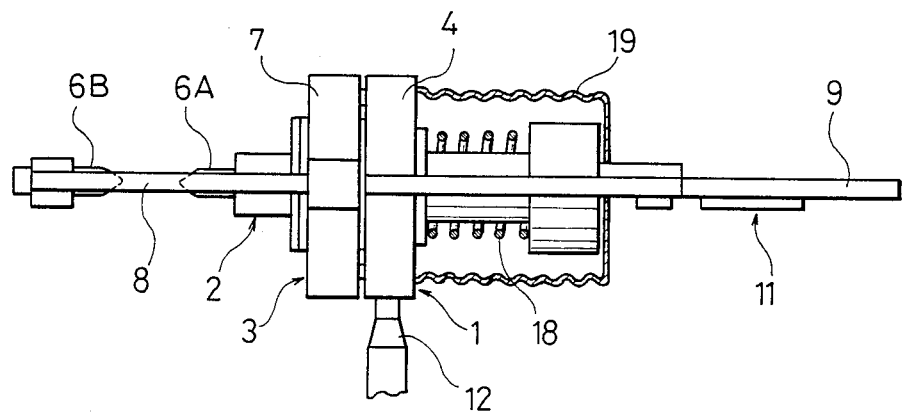
FIG. 2 is a plan view of the spot gun viewed from the direction of arrow II in FIG. 1.

Some example embodiments of this invention will now be described in detail. For the purposes of this discussion, where the words "upper and lower", "forwards and backwards", and "vertical and horizontal" will be used to indicate direction, the direction indicated should be interpreted as based upon the embodiment shown in FIG. 1. First, the first embodiment of this invention as indicated in FIGS. 1 through 4 will be described. This spot welding gun is constructed of a frame 1, having a bearing 4 at the front thereof (left hand side in FIG. 1), serving as a holder, with the frame being provided with a cable connector 5A below the bearing 4; a first electrode 2 with one projecting electrode bit 6A at the front thereof retractably mounted (retractable in the left/right direction as seen in FIG. 1) upon the bearing 4 of the frame 1, and with another cable connector 5B connected to the lower bottom edge portion thereof; and a second electrode 3 disposed upon the other side of the welding gap with an overhanging bracket 8 protruding from the top edge of a rotary base 7, with an opposing electrode bit 6B attached at its tip. The horizontal central axis 2X of electrode bit 6A of electrode 2 on one side of the welding gap and electrode bit 6B of the electrode 3 on the other side of the welding gap are aligned so as to oppose each other.

At the rear (right hand side in FIG. 1) of the frame 1 and at the rear of the first electrode 2 on one side of the welding gap, there is constructed a frame handle 9 which, in effect, includes a grip lever 11 which moves the electrode 2 backwardly and forwardly through means of the operation of a throttle lever 10 connected to the back of the electrode 2 and pivotably mounted with respect to grip lever 11. The spot gun is constructed such that if the spot gun is held in one hand by a grip handle 12 (see FIGS. 2 and 3) which projects from the side of frame 1, while at the same time the throttle lever 10 is operated with the other hand, the electrode bit 6A advances along the horizontal central axis line 2X so as to permit the object to be welded to be gripped between electrode bits 6A and 6B, and whereupon electricity is conducted through cables 13 to electrode bits 6A, 6B so as to permit spot welding.

In order to describe the operation in more detail, the frame 1 is constructed so as to have an overall bow shape and is provided with a bearing 4 at the forward lower end thereof which surrounds the horizontal central axis line 2X, and the handle 9 for mounting the grip lever 11 at the rear end thereof. The first electrode 2 is retractably mounted upon the bearing 4 by means of an insulated part 14, and its electrode bit 6A projects forwardly, while to the rear the lever 10 is connected to electrode 2 by means of another insulated part 14. This lever 10 forms a link construction by conjugating with the handle 9 by means of multiple arms, not numbered.

The other electrode 3 has a base 7 externally mounted upon the bearing 4 so that it can rotate about axis 24, and is also provided with a bracket 8 having an overhanging shape which hangs down vertically from the upper edge of the base 7 so as to be disposed in front of the electrode 2. The other electrode bit 6B is mounted to the front lower part of the bracket 8. Bracket 8 can be rotated to any optional angle around the electrode bit 6A and axis 2X.

Figure 3:
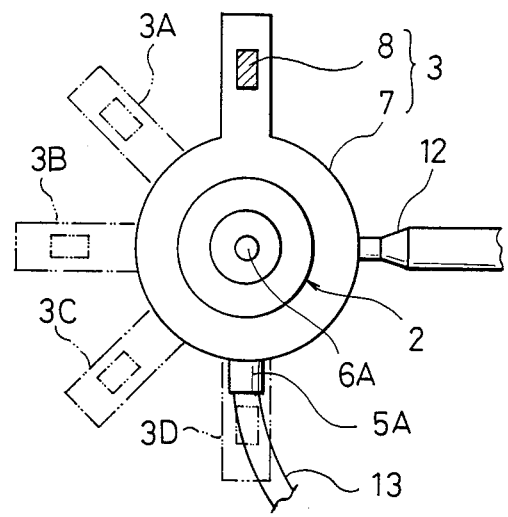
FIG. 3 is a sectional side view along the lines III—III in the embodiment in FIG. 1.
Figure 4:
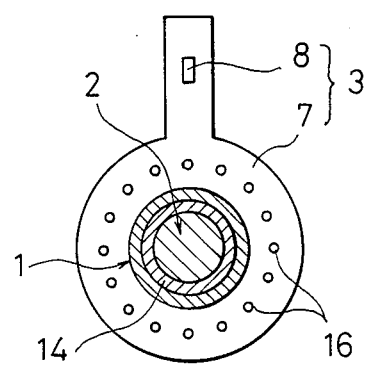
FIG. 4 is a sectional side view taken along the lines IV—IV in FIG. 1.

Furthermore, the latter electrode 3 is provided with a rotary position lock 15, so that by rotating electrode 3 to any optional position indicated by means of the dotted lines 3A-3D in FIG. 3, the rotary position can be set to a number of positions (sixteen in the example shown in the Figure) with one touch. In other words, the rotary position lock 15 of this embodiment (see FIG. 4) is constructed of a combination of a set of locking holes 16 defined upon the base 7 and arrayed concentrically with the bearing 4 and a plurality of locking balls 17 spring-biased outwardly from the frame part 1. When the base 7 is rotated by hand, the locking balls 17 fit into the locking holes 16, so that the rotation can be stopped at any desired rotary position 3A-3D. A "locking pin" may be substituted for each locking ball 17.

In the drawing, 18 is a return spring which forces the electrode 2 to retract, while 19 is a bellows cover which covers the rear end of the electrode 2.

Next, the spot gun of the second embodiment of this invention will be described with reference to FIG. 5. In the drawing, the spot gun of this embodiment is also constructed so as to comprise a frame 1, almost identical to that of the embodiment described in FIG. 1, and an electrode 2 on one side of the welding gap and another electrode 3 on the other side of the welding gap. Electrode 3 is provided with a rotary position lock which can be stopped as required at any desired rotational position.

Figure 5:
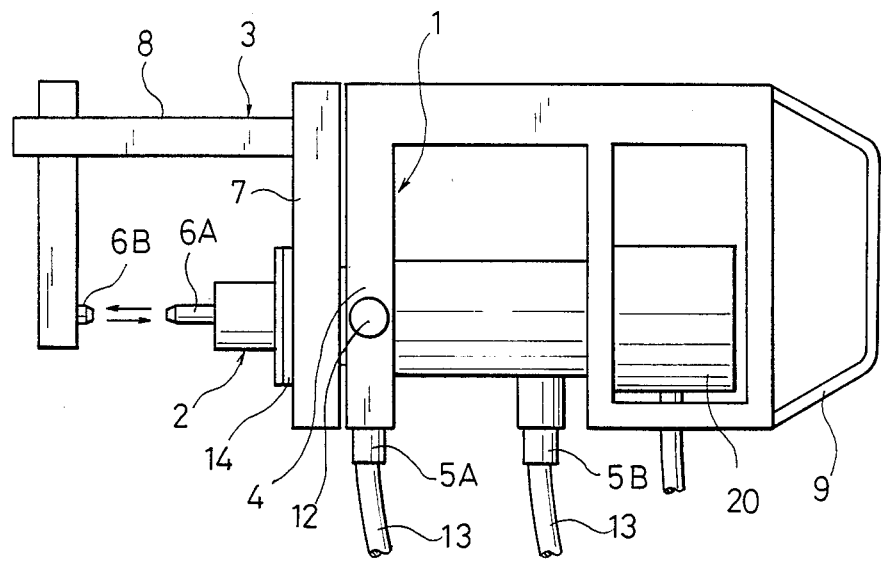
FIG. 5 is a side view of a spot gun constructed in accordance with a second embodiment of this invention.

The spot gun in FIG. 5 is constructed such that electrode 3 is formed with the electrode bit 6B disposed upon the lower end of a rod which projects downwardly from the left end of the bracket 8 which projects from the end of the base 7, so that the inner part of electrode bit 6B and the other electrode bit 6A are opposed with respect to each other. Electrode bit 6B is shorter in length than that of electrode bit 6A, and also smaller in size than its equivalent electrode in the spot gun embodiment of FIG. 1. Furthermore, the embodiment of FIG. 5 is provided with an automatic actuator 20 consisting of a magnetic or air cylinder instead of the throttle lever 10. The action of this automatic actuator 20 permits electrode 2 on one side of the welding gap to be moved forwardly and backwardly automatically. Other parts which are identical to those in the embodiment of FIG. 1 have been given the same number and their description has been omitted.

Figure 6:
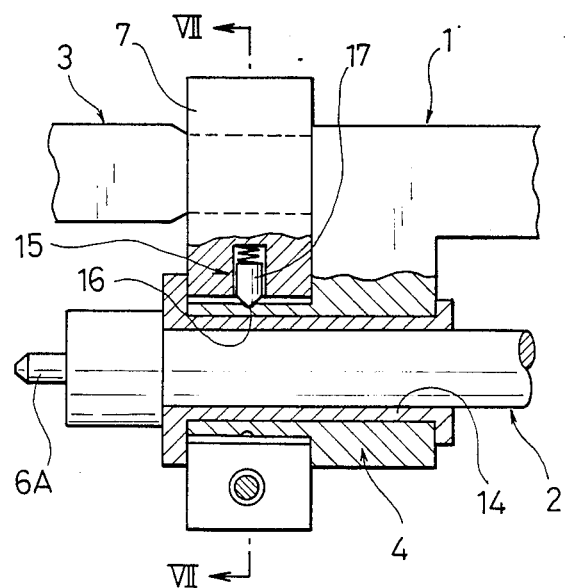
FIG. 6 is an abbreviated sectional side view of the rotary position lock constructed in accordance with another embodiment of this invention.
Figure 7:
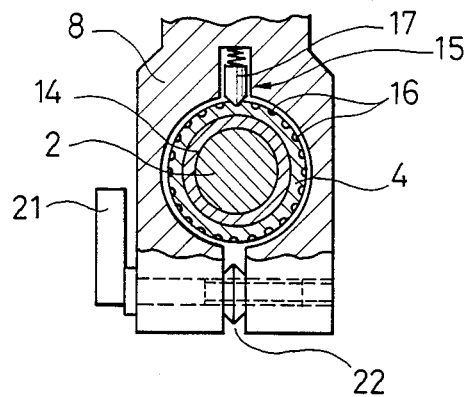
FIG. 7 is a side view along the lines VII—VII in FIG. 6.
Figure 9:
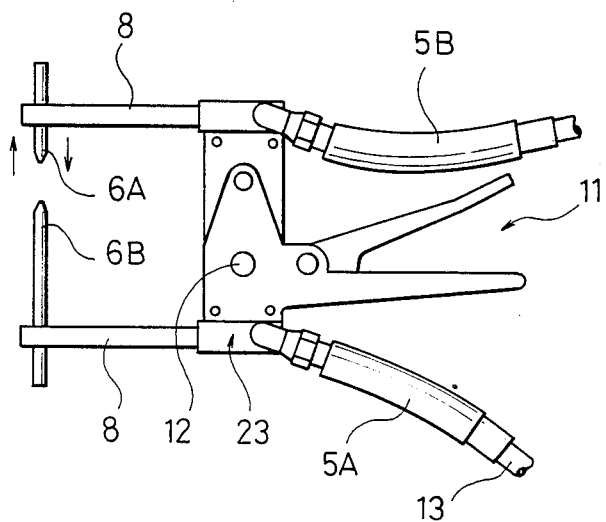
FIG. 8 is an abbreviated side view of a spot gun constructed in accordance with the third embodiment of this invention and FIG. 9 is a side view of a spot gun constructed in accordance with the prior art.

Next, another embodiment of the rotary position lock 15 will be described with reference to FIGS. 6 and 7. The lock 15 of this embodiment is constructed of adjacent parts of the bearing 4 and the base 7 of electrode 3, so that a spring biased locking pin 17 disposed upon the inside of the base 7 fits into the locking holes 16 defined upon the circumference of the bearing 4. It is further constructed with a slit 22 defined at the bottom of the base 7, with a clamp handle 21 operatively associated with this slit 22 for permitting the rotary position of electrode 3 to be accurately fixed in position. Other parts which are identical to those of the first embodiment have been given the same numbers in FIGS. 6 and 7 and their description has been omitted.

Because the spot gun of the embodiments described above is constructed such that electrode 2 disposed upon one side of the welding gap is mounted upon bearing 4 of the frame 1 and can be retractably moved backwardly and forwardly and is provided with a pair of electrode bits 6B, 6B aligned with a horizontal central axis line 2X, and furthermore, the other electrode 3 is a self-rotating device whose rotary position around the central electrode bit 6A can be set and changed as desired, during welding of window frames and other similar structures, the rotary position of electrode 3 can be adjusted by means of a one-touch operation while maintaining the position of the frame 1 connected to the two cables 13 relatively fixed with respect to its original position. If any of the positions 3A-3D shown in FIG. 3 are selected, the bracket 8 which is otherwise a hindrance can be moved from its original position; for example if moved to the position 3B of the Figure, side-welding is possible, while if the bracket is moved to 3D, welding in the upward direction can be achieved, while in positions 3A and 3C diagonal and sideways welding is possible.

This construction therefore has the considerable advantage that welding can be carried out more conveniently and accurately in all directions with the frame 1 of the spot gun body as a holder and the electrode 2 fixed in position.

In addition, this construction has the advantage of a simpler construction because there is only one bracket 8 holding the electrodes 6A, 6B. Further insertion of the electrodes into the location to be welded and the gripping of the object to be welded as well as overall handling of the spot gun are much easier than with the devices of the prior art because the electrodes arrayed at the front and back of the gun need only to be inserted from a top or bottom position to the spot to be welded.

The above has described the considerable advances made by means of the spot gun of this invention in terms of ease of spot gun operation and efficiency of use.

Figure 8:
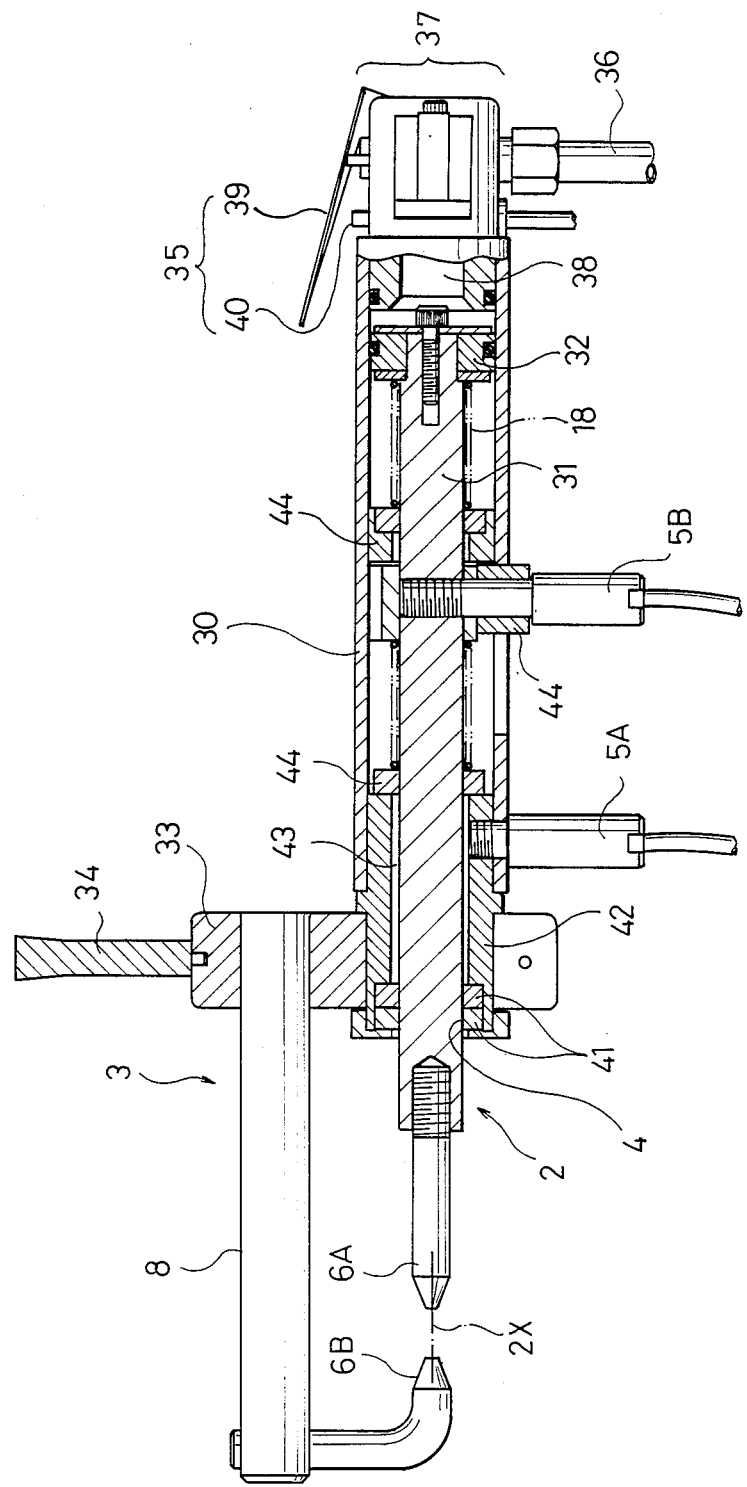

A third embodiment of this invention will now be described with reference to FIG. 8. Parts which have an identical or similar construction to equivalent parts in FIG. 1 have been given the same number and duplicate description has been omitted.

Designated at 30 is a cylinder which is a holder, mounted internally with a retractable piston rod 31. Electrode bit 6A is mounted at the tip of this piston rod 31, while at the rear of piston rod 31 there is mounted a piston 32. At the tip of the cylinder 30 a bearing 4 is constructed upon an internal circumference of an insulator part 41, while upon the outside circumference of the insulator part 41 there is positioned a covering tube 42 which is connected to the cable connector 5A, this tube 42 having an insulating gap 43 defined between itself and the piston rod 31, and at the same time being combined with a self-rotating rotary part 33 which sits astride the outer circumference thereof. This rotary part 33 is provided with a combined grip/handle 34, which when gripped and rotated by means of the operator can be used to rotate and alter the position of the bracket 8 by means of the rotary part 33. This rotary device is the same as the clamp handle previously described (see FIG. 7) and it can be clamped at a predetermined position. At the rear of cylinder 30 an air actuator 35 is provided. This air actuator 35 includes an air hose 36 connected to an air compressor not shown in the diagram, an air adjusting valve 37 which is operated so as to start or stop the air flow, an air introduction chamber 38 provided at the rear of the cylinder 30, and a switch lever 39 for electric operational control of the air flow, 40 being an electric switch while 41 and 44 are parts made of insulating material.

In this embodiment, because the holder is cylindrical, it is easier for the operator to grasp; furthermore the electrode 6A can be easily advanced through means of the operation of the air actuator, and in addition, the combined grip/handle 34 provided upon the rotary part 33 makes it easy to alter the position of the bracket 8.

Obviously, many modifications and variations of the present invention are possible in light of the above teachings. It is therefore to be understood that within the scope of the appended claims, the present invention may be practiced otherwise than as specifically described herein.

What is claimed is:

1. A spot gun for a welder machine, comprising:
   first electrode means mounted upon said gun and extending along a welding axis;
   second electrode means extending along said welding axis in a coaxially, oppositely disposed, manner with respect to said first electrode means, so as to define with said first electrode means a welding gap therebetween within which a component to be welded is to be disposed, and rotatably mounted upon said gun with respect to said first electrode means and about said welding axis so as to be selectively disposed at any one of a plurality of predetermined circumferentially spaced positions with respect to said welding axis so as to improve the accessibility of said spot gun to said component to be welded during a welding operation; and
   means for positively locking said second electrode means at said any one of said plurality of predetermined circumferentially spaced positions.

2. A spot gun as set forth in claim 1, wherein said gun further comprises:
   frame means for supporting said first electrode means; and
   rotary support means, for mounting said second electrode means, rotatably mounted upon said frame means.

3. A spot gun as set forth in claim 2, wherein said means for positively locking said second electrode means comprises:
   a plurality of locking holes defined within said rotary support means and arranged in a circular array about said welding axis; and
   at least one locking ball mounted upon said frame means for mating engagement within at least one of said plurality of locking holes defined within said rotary support means.

4. A spot gun as set forth in claim 3, wherein:
   said at least one locking ball comprises a plurality of locking balls respectively disposed within said plurality of locking holes.

5. A spot gun as sst forth in claim 2, wherein said means for positively locking said second electrode means comprises:
   a plurality of locking holes defined within said frame means and arranged in a circumferential array about said welding axis; and
   at least locking pin mounted upon said rotary support means for mating engagement within at least one of said plurality of locking holes defined within said frame means.

6. A spot gun as set forth in claim 2, further comprising:
   operative handle means, fixedly mounted upon said rotary support means, for rotating said rotary support means to any one of said predetermined circumferentially spaced positions.

7. A spot gun as set forth in claim 2, further comprising:
   first handle means integrally formed with said frame means for holding said spot gun within one hand of a welding operator and extending substantially parallel to said welding axis; and
   second handle means fixedly secured to said frame means, and extending substantially perpendicular to said welding axis, for holding said spot gun within the other hand of said welding operator.

8. A spot gun as set forth in claim 2, further comprising:
   an overhanging support bracket mounting said second electrode means within one end thereof and attached at another end thereof to said rotary support means.

9. A spot gun as set forth in claim 2, wherein:
   said frame means comprises a cylindrical housing within which said first electrode means is coaxially disposed.

10. A spot gun as set forth in claim 9, wherein:
    said frame means further comprises a piston reciprocably mounted within said cylindrical housing.

11. A spot gun as set forth in claim 10, further comprising:
    air actuating means operatively connected to said cylindrical housing means and said piston for controlling the movement of said piston within said cylindrical housing.

12. A spot gun as set forth in claim 1, further comprising:
    means mounting said first electrode means for axial movement along said welding axis; and
    throttle lever means interconnecting said first electrode mounting means and said frame means for controlling said axial movement of said first electrode means along said welding axis.

13. A spot gun as set forth in claim 12, further comprising:
    spring biasing means mounted upon said first electrode means for biasing said first electrode means away from said second electrode means along said welding axis.

14. A spot gun as set forth in claim 13, further comprising:
    bellows-type cover means for covering said spring-biasing means operatively biasing said first electrode means.

15. A spot gun as set forth in claim 1, further comprising:
    means mounting said first electrode means for axial movement along said welding axis; and magnetic means connected to said means mounting said first electrode means for controlling said axial movement of said first electrode means along said welding axis.

16. A spot gun as set forth in claim 1, further comprising:

means mounting said first electrode means for axial movement along said welding axis; and air cylinder means connected to said means mounting said first electrode means for controlling said axial movement of said first electrode means along said welding axis.

* * * * *